(12) United States Patent
Cheikh

(10) Patent No.: US 12,243,365 B2
(45) Date of Patent: Mar. 4, 2025

(54) METHOD FOR ACTIVATING A FUNCTION OF A VEHICLE VIA AN ULTRAWIDE BAND WITH AN ITEM OF PORTABLE USER EQUIPMENT, ASSOCIATED SYSTEM AND DEVICE FOR ACTIVATING A FUNCTION

(71) Applicant: Continental Automotive Technologies GmbH, Hannover (DE)

(72) Inventor: Mohamed Cheikh, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/023,865

(22) PCT Filed: Jul. 12, 2021

(86) PCT No.: PCT/EP2021/069299
§ 371 (c)(1),
(2) Date: Feb. 28, 2023

(87) PCT Pub. No.: WO2022/048817
PCT Pub. Date: Mar. 10, 2022

(65) Prior Publication Data
US 2023/0334921 A1    Oct. 19, 2023

(30) Foreign Application Priority Data
Sep. 1, 2020 (FR) .................................. FR2008858

(51) Int. Cl.
*G07C 9/00* (2020.01)
*B60R 25/20* (2013.01)
(Continued)

(52) U.S. Cl.
CPC ........ *G07C 9/00309* (2013.01); *B60R 25/209* (2013.01); *G01S 5/0284* (2013.01); *G01S 13/0209* (2013.01); *G07C 2209/63* (2013.01)

(58) Field of Classification Search
None
See application file for complete search history.

(56) References Cited

U.S. PATENT DOCUMENTS 11,248,549 B2 *  2/2022  Moro .................... F02D 41/042
11,313,296 B2 *  4/2022  Hiraoka ............. F02D 13/0219
(Continued)

FOREIGN PATENT DOCUMENTS

CN          103339524 A          10/2013
CN          104520729 A           4/2015
(Continued)

OTHER PUBLICATIONS

International Search Report and Written Opinion for International Application No. PCT/EP2021/069299, mailed Oct. 29, 2021, 14 pages.
(Continued)

*Primary Examiner* — Carlos Garcia
(74) *Attorney, Agent, or Firm* — Buchanan Ingersoll & Rooney PC

(57) ABSTRACT

A method for activating a vehicle function using portable user equipment communicating via ultra-wide band with an activation device on the vehicle. The activation of the vehicle function is carried out as a function of a position of the portable equipment relative to a boundary between an internal zone and an external zone of the vehicle. The activation method including: previously equipping the vehicle with an internal and external antennas; determining the presence of the portable equipment in an authorization zone around the vehicle; storing a power delay of the multi-path ultra-wide band signals received by each antenna according to time; determining an attenuation delay of the received power; comparing the attenuation delay with at least one reference delay; determining whether the portable equipment is located in the internal zone or in the external (Continued)

zone; activating the vehicle function corresponding to the position of the portable equipment.

10 Claims, 8 Drawing Sheets

(51) Int. Cl.
   *G01S 5/02*     (2010.01)
   *G01S 13/02*    (2006.01)

(56) References Cited

U.S. PATENT DOCUMENTS

| | | |
|---|---|---|
| 2008/0048829 A1 | 2/2008 | Nakajima et al. |
| 2013/0314269 A1 | 11/2013 | Jansseune |
| 2015/0160330 A1 | 6/2015 | Booij et al. |
| 2018/0103414 A1 | 4/2018 | Golsch |
| 2018/0188349 A1 | 7/2018 | Lee et al. |
| 2018/0252794 A1 | 9/2018 | Hermann |
| 2020/0117186 A1 | 4/2020 | Maehara et al. |

FOREIGN PATENT DOCUMENTS

| | | |
|---|---|---|
| CN | 109466506 A | 3/2019 |
| CN | 109844823 A | 6/2019 |
| CN | 110603176 A | 12/2019 |
| EP | 3 605 476 A1 | 2/2020 |
| FR | 2971386 A1 | 8/2012 |
| WO | 92/06455 A1 | 4/1992 |

OTHER PUBLICATIONS

International Search Report and Written Opinion for International Application No. PCT/EP2021/069299, mailed Oct. 29, 2021, 17 pages (French).

French Search Report for French Application No. 2008858, dated May 11, 2021 with translation, 18 pages.

Office Action (First Office Action) issued Jul. 31, 2024, by the National Intellectual Property Administration, P. R. China in corresponding Chinese Patent Application No. 202180053019.0 and an English translation of the Office Action. (33 pages).

Notice of Allowance (Notification to Grant Patent Right for Invention( issued Jan. 10, 2025, by the National Intellectual Property Administration, P. R. China in corresponding Chinese Patent Application No. 202180053019.0 and an English translation of the Notice of Allowance. (6 pages).

\* cited by examiner

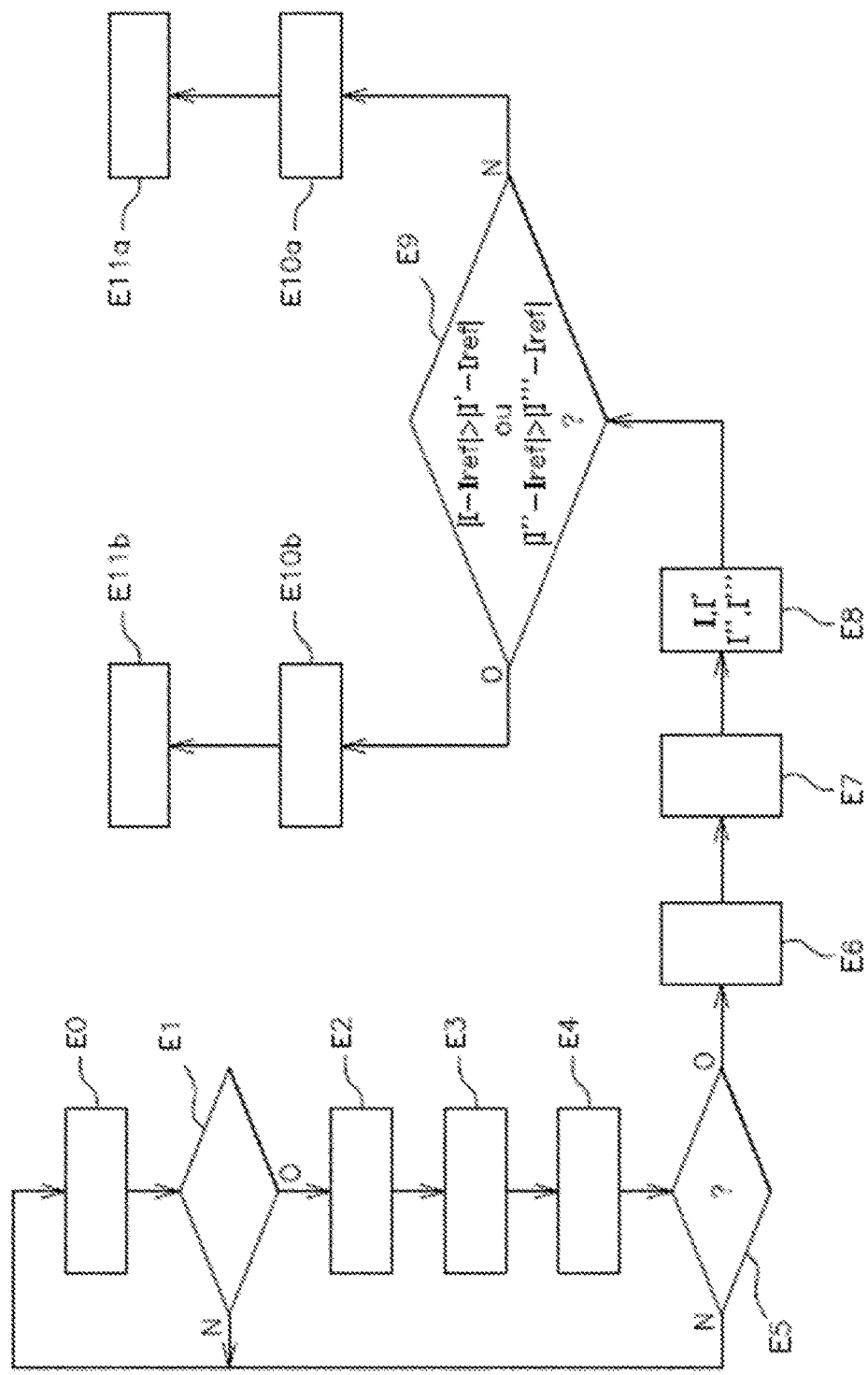

METHOD FOR ACTIVATING A FUNCTION OF A VEHICLE VIA AN ULTRAWIDE BAND WITH AN ITEM OF PORTABLE USER EQUIPMENT, ASSOCIATED SYSTEM AND DEVICE FOR ACTIVATING A FUNCTION

CROSS REFERENCE TO RELATED APPLICATIONS

This application is the U.S. National Phase application of PCT International Application No. PCT/EP2021/069299, filed Jul. 12, 2021, which claims priority to French Patent Application No. FR2008858, filed Sep. 1, 2020, the contents of such applications being incorporated by reference herein.

FIELD OF THE INVENTION

The invention relates to a method for activating a function of a motor vehicle via ultra-wide band (ULB) using an item of portable user equipment, and to an associated system and device for activating a function.

The invention more specifically applies to "hands-free" access and/or starting systems for motor vehicles. A "hands-free" access system for a motor vehicle allows an authorized user to lock and/or unlock the doors of their vehicle or to start the vehicle without using a key. To this end, the vehicle identifies an item of portable equipment such as a fob or a remote control carried by the user and if the fob or the remote control is located in a predetermined zone around the vehicle or in the vehicle and is identified as belonging to the vehicle, then the vehicle automatically locks/unlocks its doors or starts depending on the intention of the user, without the user having to use a key.

BACKGROUND OF THE INVENTION

This "hands-free" access system is known to a person skilled in the art. It is generally made up of an electronic control unit on board the vehicle, of one or more radio frequency (RF) antenna(s) located on the vehicle and of a fob or an identification remote control comprising an RF antenna carried by the user.

Exchanging an identifier between the item of portable equipment and the vehicle via the RF antennas and the electronic control unit allows the item of portable equipment to be identified by the vehicle and the locking or unlocking of the doors or the starting of the vehicle to be triggered.

The identifier can be contained in an item of portable equipment other than a fob or a remote control, for example, it can be contained in a mobile telephone or "smartphone", or a watch worn by the user.

The identifier is generally exchanged by Radio Frequency (RF) and Low Frequency (or LF) waves. The vehicle transmits, firstly via the LF antennas, an LF polling signal, and the item of portable equipment, if it is located in the reception zone of said signal (i.e., a predetermined zone around the vehicle), returns an RF presence message to the vehicle containing its identifier.

The precise location of the item of portable equipment around the vehicle is found by measuring the intensity of the LF signal received by the item of portable equipment (via the antennas and the electronic control unit) originating from the vehicle, more commonly called RSSI ("Received Signal Strength Indication") measurements. The measurement of the power of the signal, originating from each LF antenna, received by the item of portable equipment is received and analyzed by a locating device on board the vehicle, which thus determines the position of the item of portable equipment relative to said LF antennas, i.e., relative to the vehicle.

Depending on the location of the item of portable equipment identified by the vehicle, in said location zones certain actions specific to said location zones are automatically carried out, such as starting the vehicle, unlocking/locking or pre-starting the lighting of the passenger compartment (also called "welcome lighting").

The RSSI measurement allows the item of portable equipment to be precisely located in the location zones, i.e., around and inside the vehicle, in order to allow not only locking/unlocking of the doors, but also starting of the vehicle, when the item of portable equipment is detected inside the vehicle.

In the case whereby the item of portable equipment is a mobile telephone, RF (for example, in the ISM bands) and LF (for example, at 125 kHz) communication with the vehicle is not always possible, since most mobile telephones do not have RF, or LF communication means, the frequencies of which are compatible with those used when communicating with a vehicle, such as the frequencies of 315 MHz and of 433.92 MHz for RF and of 125 kHz for LF.

However, mobile telephones now have the Bluetooth® or Bluetooth Low Energy "BLE" communication standard, i.e., Ultra-High Frequency (UHF) communication from 2402 MHz to 2480 MHz or even the Ultra-Wide Band communication standard, i.e., a short-range wireless communication protocol (IEEE 802.15.4a), that allows a very wide frequency band to be used. Like Bluetooth and Wi-Fi, this communication protocol uses radio waves, but at a very-high frequency, it includes 14 communication channels with a bandwidth equal to 500 MHz for each channel, in the frequency range ranging from 3.1 GHz to 10.6 GHz. A UWB transmitter can send pulses every two nanoseconds.

These communication standards, BLE, Bluetooth, or UWB, have the advantage of being universal and therefore do not require specific approval for each country (only "Bluetooth Low Energy" or "UWB" international certification), as is the case with the current RF and LF communication standards, the operating frequency of which differs depending on the countries.

Therefore, the "hands-free" system for accessing and/or starting a vehicle needs to be adapted so that it can also operate with a mobile telephone equipped with the Bluetooth® or UWB communication standard and not only via radio and low-frequency waves (RF, LF).

The advantage of the Bluetooth® communication standard is that it allows a large communication range of approximately 250 m around the vehicle. However, it does not allow the presence of the item of portable equipment to be precisely detected at shorter distances. For example, when the item of portable equipment is located inside the vehicle and the user wishes to start their vehicle, the precise location of the item of portable equipment that was possible with the communication device of the prior art, operating by exchanging RF and LF waves, is no longer possible with Bluetooth®. Indeed, the RSSI measurement of a Bluetooth signal is very imprecise and significantly varies as a function of the environment (noise, disturbances) and it is not possible to know whether the item of portable equipment, the position of which is fixed, is 5 m, or 10 m or 40 m or more away from the vehicle.

Therefore, it is no longer possible to activate a function such as starting the vehicle using Bluetooth® communication, since starting must only be authorized when the item of portable equipment is located inside the vehicle, and a few centimeters away from the UHF antennas of the vehicle.

Given the significant variation of the RSSI of Bluetooth®, detecting said item of portable equipment a few centimeters away from UHF antennas is not possible.

The UWB communication standard for its part allows more precise locating than can be achieved by the Bluetooth standard, and is less energy consuming. From the prior art, using the power of the UWB signal is known by emitting short pulses in order to measure the distance between the item of portable equipment and the vehicle.

One solution of the prior art involves using the time of flight, which allows the propagation time of the waves to be estimated, and the distance between the item of portable equipment and the vehicle to be deduced therefrom.

However, this solution has several disadvantages:
a. the UWB signal is generally transmitted by taking several propagation paths, due to the numerous reflections on the metal parts of the vehicle to one or more receiver(s) (antennas) on board the vehicle, the signals therefore arrive with a delay related to the length of the propagation path, these delays create significant errors with respect to determining the location of the item of portable equipment;
b. the time of flight is computed, between the item of portable equipment and at least three receivers (antennas) visible by the item of portable equipment, if the item of portable equipment is located on one side of the vehicle, there is an interruption in communication with the one or more antenna(s) that are located on the other side of the vehicle, i.e., not "visible" for the item of portable equipment, the computation of the time of flight then cannot be carried out;
c. the UWB signal is sensitive to the orientation of the item of portable equipment and to its position relative to the body of the user, this sensitivity affects the computation of the time of flight and generates errors with respect to the location of the item of portable equipment;
d. the diversity of the items of portable equipment, in terms of the type and the position of the antenna, the transmitted power and the reception sensitivity also affects the computation of the time of flight;
e. finally, the location method using the time of flight, would require, in order to partially overcome the aforementioned disadvantages, eight antennas on the vehicle, four located outside the vehicle and four located inside the vehicle, which represents a significant extra cost.

SUMMARY OF THE INVENTION

An aspect of the invention proposes a method for activating a function of a vehicle via ultra-wideband communication with an item of portable user equipment, as well as a device for activating an associated function allowing these disadvantages to be overcome.

In this case, an aspect of the invention proposes a method for activating a function via ultra-wideband waves for precisely locating the item of portable user equipment inside or outside the vehicle.

An aspect of the invention proposes a method for activating a vehicle function via ultra-wide band communication using an item of portable user equipment communicating via ultra-wide band with an activation device on board the vehicle, the activation of the vehicle function being carried out as a function of a position of the item of portable equipment relative to a boundary between an internal zone and an external zone of the vehicle, the activation method being characterized in that it comprises the following steps:
a. previously equipping the vehicle with an internal antenna and an external antenna;
b. determining the presence of the item of portable equipment in an authorization zone around the vehicle;
c. storing a power delay of the multi-path ultra-wide band signals received by each antenna according to time;
d. determining, for each antenna and for a power threshold value, an attenuation delay of the received power;
e. comparing said attenuation delay with at least one reference delay;
f. determining, as a function of the result of said comparison, whether the item of portable equipment is located in the internal zone or in the external zone;
g. activating the vehicle function corresponding to the position of the item of portable equipment.

Appropriately, the reference delay is previously determined as a function of the power of the received signals, for each antenna when the item of portable equipment is located at the boundary between the internal zone and the external zone of the vehicle.

Advantageously, the attenuation delay is determined for several power thresholds and is compared with several corresponding reference delays.

The vehicle function involves unlocking a door of the vehicle, when the item of portable equipment is located in the external zone.

The vehicle function involves starting the vehicle when the item of portable equipment is located in the internal zone of the vehicle.

An aspect of the invention also relates to a device for activating a vehicle function via ultra-wideband, intended to be on board a vehicle and communicating via ultra-wideband with an item of portable user equipment, the activation of the vehicle function being carried out as a function of a position of the item of portable equipment relative to a boundary between an internal zone and an external zone of the vehicle, said device comprising an electronic management unit controlling the activation of the function, being characterized in that it comprises:
a. an internal antenna;
b. an external antenna;
c. means for determining the presence of the item of portable equipment in an unlocking zone around the vehicle;
d. means for analyzing and processing the multi-path ultra-wideband signals received by said antennas, suitable for:
  i. storing a power delay of the multi-path ultra-wideband signals received by each antenna according to time;
  ii. determining, for each antenna and for a power threshold value, an attenuation delay;
  iii. comparing said attenuation delay with at least one reference delay;
  iv. determining, as a function of the result of said comparison, whether the item of portable equipment is located in the internal zone or in the external zone;
  v. activating the vehicle function corresponding to the location of the item of portable equipment.

In a first embodiment of the invention, the analysis and processing means are included in a transmission/reception module of the vehicle.

An aspect of the invention also applies to a system for activating a vehicle function, comprising an activation device according to any one of the features listed above and an item of portable user equipment, the system being characterized in that the analysis and processing means are also included in the item of portable equipment.

In a second embodiment of the invention:
- a. said device comprises an electronic management unit controlling the activation of the function, an internal antenna, an external antenna, at least one transmission/reception module connected to said antennas, means for determining the presence of the item of portable equipment in an unlocking zone around the vehicle; and
- b. said item of portable equipment comprises means for analyzing and processing the multi-path ultra-wideband signals received by said antennas, suitable for:
  - i. storing a power delay of the multi-path ultra-wideband signals received by each antenna according to time;
  - ii. determining an attenuation delay for at least one power threshold for each antenna;
  - iii. comparing said attenuation delay with at least one reference delay;
  - iv. determining, as a function of said comparison, whether the portable equipment is located in the internal zone or in the external zone;
  - v. activating the vehicle function corresponding to the location of the item of portable equipment.

Finally, an aspect of the invention relates to any motor vehicle, comprising an activation device according to any one of the features listed above.

BRIEF DESCRIPTION OF THE DRAWINGS

Further features and advantages of the invention will become more clearly apparent upon reading the following description. This description is purely illustrative and should be read with reference to the appended drawings, in which:

FIG. 2 is a flowchart showing the method for activating a vehicle function according to the invention;

DETAILED DESCRIPTION OF THE PREFERRED EMBODIMENTS

Figure 1:
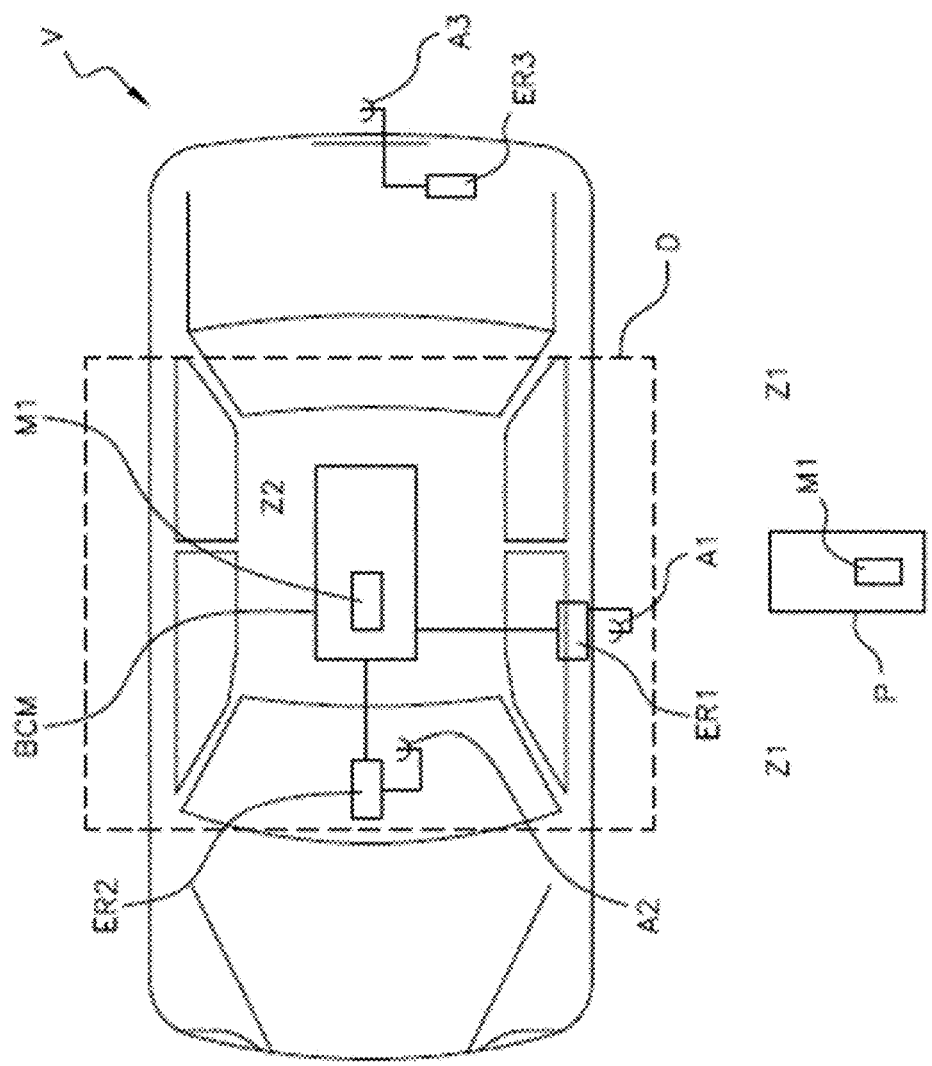
FIG. 1 schematically shows a vehicle equipped with the device for activating a vehicle function according to the invention.

FIG. 1, according to the invention, schematically shows a motor vehicle V, equipped with a device D for activating a vehicle function capable of communicating via UWB communication with an item of portable user equipment P and of precisely locating said item of portable equipment around the vehicle V via UWB communication, said device D comprising:
- a. a first UWB signal transmission/reception module ER1 connected to an external UWB antenna A1;
- b. a second UWB signal transmission/reception module connected to an internal UWB antenna A2;
- c. an electronic management unit, also called "BCM" (Body Control Module), electrically connected to the first and second modules.

The first module ER1 and the second module ER2 are equipped with software means or electronic components allowing the transmission and reception of UWB signals via the internal antenna A1 and the external antenna A2, respectively. The first and second modules can be combined into a single module and form a single module comprising the software means and/or electronic components allowing the transmission and reception of UWB signals via the two antennas A1 and A2 and controlling the transmission and reception of the two antennas A1, A2. Each antenna can be connected to a dedicated transmission/reception circuit, thus allowing the transmission and reception of the UWB signals at the same time by the two antennas, A1, A2, or, alternatively, a single transmission/reception circuit can be connected to the two antennas A1, A2 for transmitting and receiving UWB signals via the two antennas, with said antennas then operating in sequential mode. In this latter configuration, the transmission/reception circuit electrically switches from one antenna to the other A1, A2 at a fixed frequency. This is known to a person skilled in the art.

The internal and external antennas are radio frequency antennas for transmitting and receiving signals via UWB, that is in the frequency range located between 3 GHz and 10 GHz. An internal antenna A2 is understood to mean an antenna A2 located inside the vehicle V, for example, in the passenger compartment or oriented toward the inside of the vehicle V. An external antenna A1 is understood to mean an antenna preferably located inside or on the bodywork of the vehicle V, i.e., located on the outer surface of the vehicle V or oriented toward the outside of the vehicle V.

The first and second modules ER1, ER2 can, for their part, be located anywhere inside the vehicle V.

The electronic management unit BCM for its part allows the signals received by the first and second modules ER1 and ER2 to be processed and also controls the transmission of the signals to the item of portable equipment P, via said first and second modules and associated external and internal antennas A1, A2.

The device D also comprises processing and analysis means M1 (see FIG. 1) for the signals received by the two antennas A1, A2 that allow the location of the item of portable equipment P to be determined relative to the vehicle and either the unlocking of the door, if the item of portable equipment is located outside the vehicle V, or the starting of the engine of the vehicle V, if the item of portable equipment P is located inside the vehicle V, to be controlled.

Said processing and analysis means M1 includes a processor and a memory, and can be included either in the vehicle V, for example, in the electronic management unit BCM, or in the first and second module ER1, ER2 or even in the item of portable equipment P, or in both. Said means M1 are connected to the unlocking control means and/or to the starting means of the vehicle V that are generally located in the electronic management unit BCM. Said electronic management unit BCM controls the mechanism for opening the door and/or the starting circuit of the vehicle V.

In the case whereby the processing and analysis means M1 are also or are solely located in the item of portable equipment P, the invention then applies to the system made up of the activation device D and of the item of portable equipment P. The presence of the processing and analysis means M1 in the vehicle V and in the item of portable equipment P, i.e., said means M1 are duplicated, provides redundancy for the processing of the information and for decision-making.

In the case whereby the processing and analysis means M1 are only included in the item of portable equipment P, then the vehicle actions are only controlled by the telephone, which will either request unlocking or starting of the vehicle, as a function of the location of the item of portable equipment P, from the mechanism for opening the door and/or the circuit for starting the vehicle V.

In this case, the processing means M1 allow an attenuation delay of the UWB signals received by the first and second antennas A1, A2 to be stored on the basis of a parameter called PDP (Power Delay Profile). Said PDP parameter provides the power value, as a function of time, of received signals that have propagated along a plurality of paths, in this case direct paths but also indirect paths, in which the signals were found to be reflected by any metal surface of the vehicle V or by the ground. This is illustrated in FIGS. 4A and 4B.

Figure 4A:
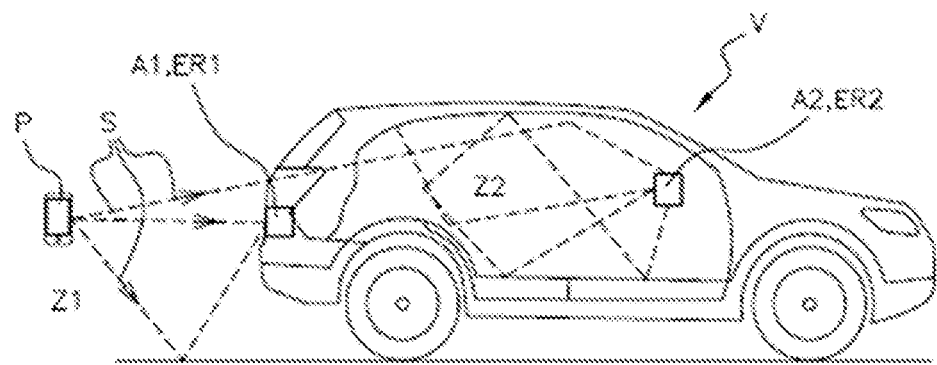
FIG. 4A schematically shows the multiple propagation paths of a UWB signal transmitted by the item of portable equipment, when said equipment is located outside the vehicle.

FIG. 4A shows a UWB signal S transmitted by the item of portable equipment P intended for the vehicle V, when the item of portable equipment S is located outside the vehicle V, in an external zone Z1. Said signal S is characterized by a plurality of propagation paths, including a path that is reflected by the ground. Only a portion of these propagation paths enters the vehicle V. When the signal enters the passenger compartment of the vehicle, the signal is reflected even more due to the presence of many metal surfaces.

Figure 4B:
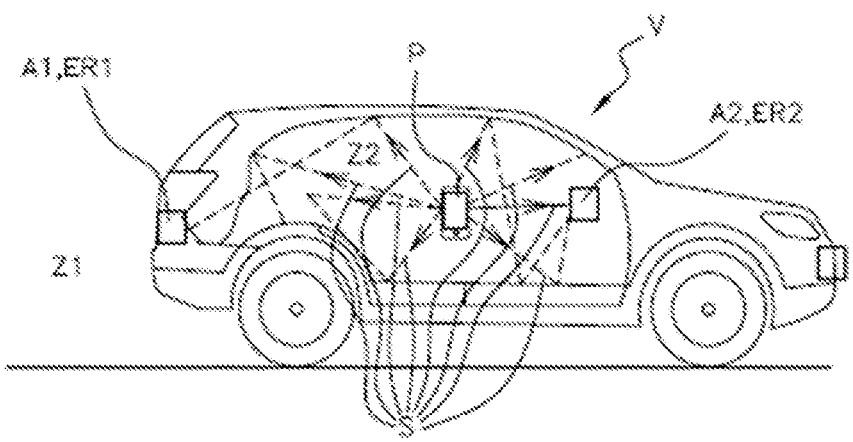
FIG. 4B schematically shows the multiple propagation paths of a UWB signal transmitted by the item of portable equipment, when said equipment is located inside the vehicle.

FIG. 4B shows a UWB signal S transmitted by the item of portable equipment P intended for the vehicle V, when the item of portable equipment S is located inside the vehicle V, in an internal zone Z2. In this case, the signal also divides into a plurality of propagation paths that reflect on the various metal surfaces of the passenger compartment.

Indeed, as will be explained hereafter, by comparing the power attenuation delays of the multi-path signals, which are received by the external antenna A1 (FIG. 4A) and the power attenuation delays of the reflected multi-path signals that are received by the internal antenna A2 (FIG. 4B) relative to at least one reference delay Iref, it is then possible to determine the location of the item of portable equipment P either outside the vehicle V (external zone Z1 in FIGS. 1, 4A, 4B and 5A), or inside the vehicle V (internal zone Z2 in FIGS. 1, 4A, 4B and 5A).

To this end, and as will be described hereafter, the analysis and processing means M1 are suitable for:
  a. storing a power delay PDP of the multi-path ultra-wideband signals received by each antenna A1, A2 according to time;
  b. determining an attenuation delay I, I', I", I''' for at least one power threshold T for each antenna A1, A2;
  c. comparing said attenuation delay I, I', I", I''' with at least one reference delay Iref;
  d. determining, as a function of the result of said comparison, whether the item of portable equipment P is located in the internal zone Z2 or in the external zone Z1;
  e. activating the vehicle function corresponding to the position of the item of portable equipment P.

The activation device D, which is intended to be on board the vehicle V, allows precise location of the portable user device relative to the vehicle, i.e., either in the internal zone Z2, or in the external zone Z1 of the vehicle V; in order to activate a function of the vehicle, either unlocking if the item of portable equipment P is located in the external zone Z1 or starting the engine of the vehicle, if the portable user equipment P is located in the internal zone Z2.

Unlike the prior art, which requires at least three associated antennas located on the vehicle V in order to determine the position of the portable user equipment P relative to the vehicle V by triangulation, the activation device according to the invention for its part only comprises at least two antennas A1, A2, one antenna A1 located outside the vehicle V, for example, on the bodywork of the door on the driver seat side, and the other antenna A2 located inside, for example, in the central console, located between the two front seats.

The external antenna A1 is preferably, but in a non-limiting manner, located on the door to be unlocked, in this case, in this example, on the front door on the driver side. The first module ER1 electrically connected to said antenna A1 for its part is located on or inside the vehicle V, its position is not important.

If wishing to unlock the rear trunk of the vehicle V, then adding a third antenna A3 (see FIG. 1) to the outside of the vehicle can be contemplated, on the rear trunk, which antenna is electrically connected either to the single transmission/reception module already connected to the internal antenna A2 and the external antenna A1, or is connected to an additional module ER3 (not shown) dedicated to this third antenna A3.

According to an aspect of the invention, at least two antennas are therefore required, one inside and one outside (A1, A2) the door to be unlocked.

The method for activating a vehicle function according to an aspect of the invention will now be described with reference to FIG. 2, and with the support of FIGS. 3A-3D, 4a, 4b, 5A, 5B.

During an initial step E0, the vehicle V recurrently transmits UWB signals in order to detect the presence of an item of portable equipment P around the vehicle V, in the UWB transmission zone. This transmission method is also called "polling". To this end, the electronic unit BCM controls the transmission of UWB signals via the first module ER1 and the associated external antenna A1.

In step E1, if an item of portable equipment P receives this polling signal, this means that the item of portable equipment P is located in the UWB communication zone with the vehicle V (step E2). Said item of portable equipment P sends a response signal to the vehicle V, otherwise, if the item of portable equipment P does not receive this polling signal, then the polling method continues (returning to the preliminary step E0).

The polling signal that the item of portable equipment P receives is timestamped, similarly the response signal that the item of portable equipment P sends to the vehicle V is also timestamped.

When the vehicle V receives the response signal (step E3), it in turn sends a confirmation signal to the item of portable equipment P (step E3), which is also timestamped.

By computing the times of flight of the response signal from the item of portable equipment P to the vehicle V (step E4) and the time of flight of the confirmation signal from the vehicle V to the item of portable equipment P, it is thus possible to determine the presence of the item of portable equipment P in a predetermined zone around the vehicle, a fairly close zone, which corresponds to the zone for authorizing actions on the vehicle V, for example, the authorization to unlock or start heated seats or even to turn on lights. This location method is that of the prior art and is based on the time of flight. However, as has been explained previously, this method is imprecise and does not make it possible to know whether the item of portable equipment P is outside or inside the vehicle V.

In step E5, a check is undertaken to determine whether the time of flight corresponds to the item of portable equipment P being located in the unlocking authorization zone or outside said zone.

It should be noted that checking the presence of the item of portable equipment P in the unlocking authorization zone can be carried out by any other method, for example, by radio frequency, and low frequency communication, by Bluetooth communication, or BLE (Bluetooth Low Energy®), or any communication means allowing approximate detection of the presence of the item of portable equipment P in the unlocking authorization zone around the vehicle V.

If the item of portable equipment P is located in the unlocking authorization zone (step E5), then the "PDP" for each module is computed. More specifically, the power of the signals, or also called "path power" (in dBm), in this case all the multi-path signals received by each antenna, are stored as a function of time by the analysis and processing means M1 of each module, of the external module ER1 (step E6), and then of the internal module ER2 (step E7), this is illustrated in FIGS. 3A, 3B, 3C, 3D.

Figure 3A:
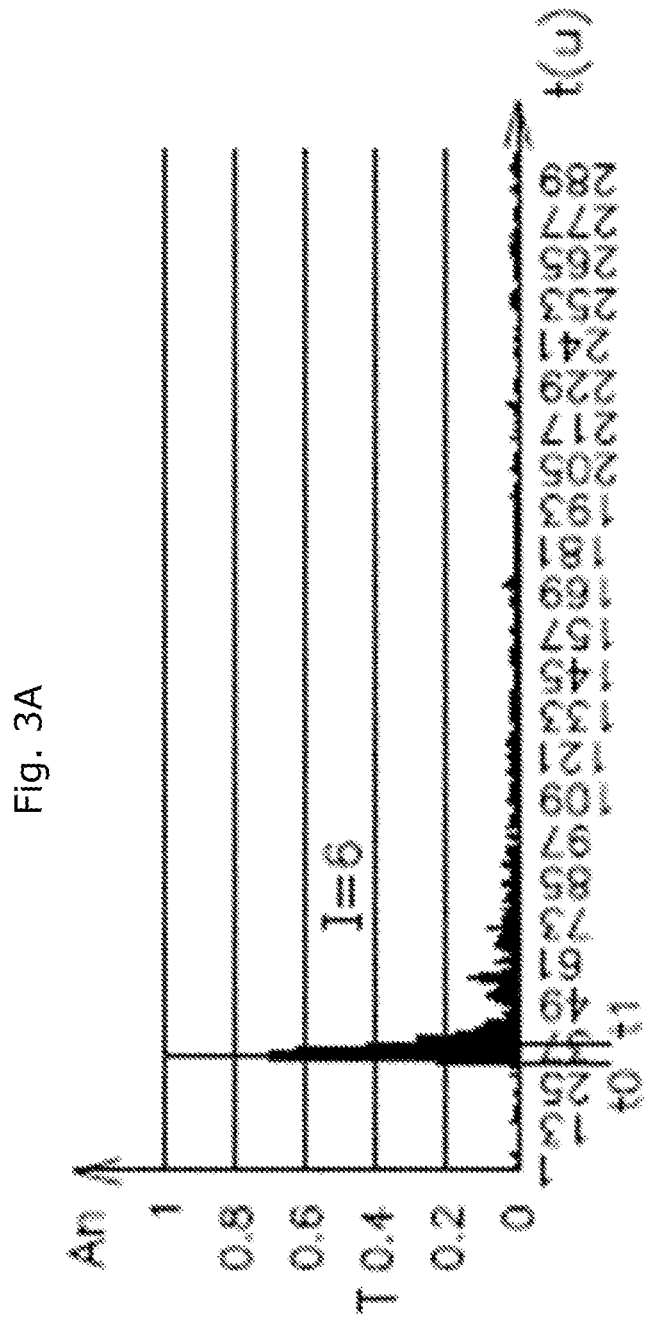
FIG. 3A is a graph showing, according to time, the normalized power of the multi-path signals received by the external UWB antenna when the item of portable equipment P is located outside the vehicle V.
Figure 3B:
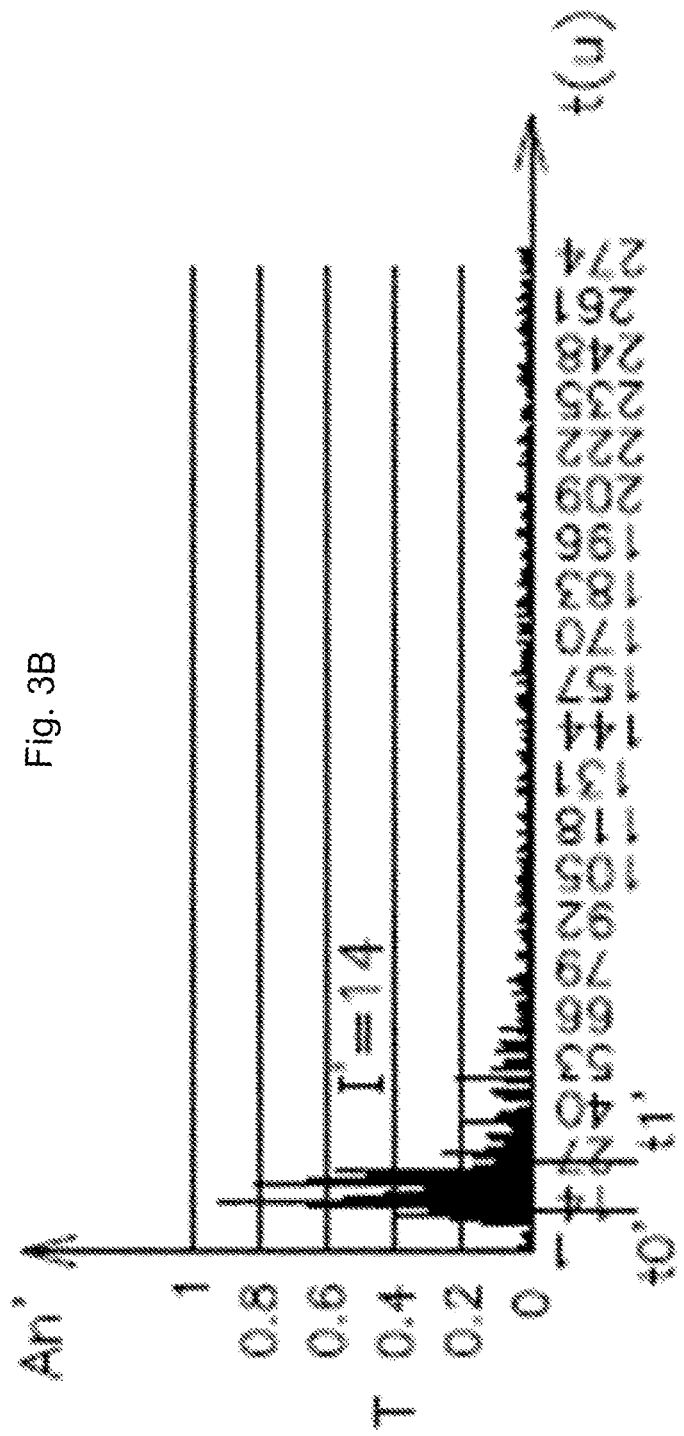
FIG. 3B is a graph showing, according to time, the normalized power of the multi-path signals received by the internal UWB antenna when the item of portable equipment P is located outside the vehicle V.
Figure 3C:
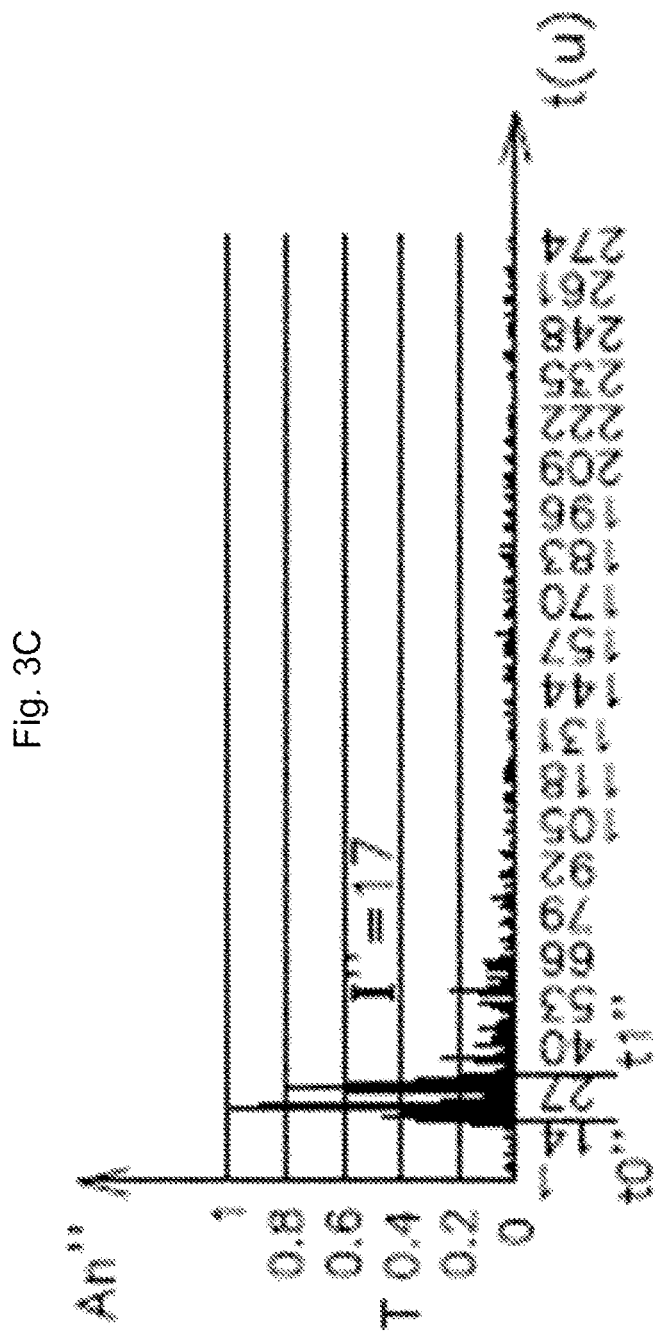
FIG. 3C is a graph showing, according to time, the normalized power of the multi-path signals received by the external UWB antenna when the item of portable equipment P is located inside the vehicle V.
Figure 3D:
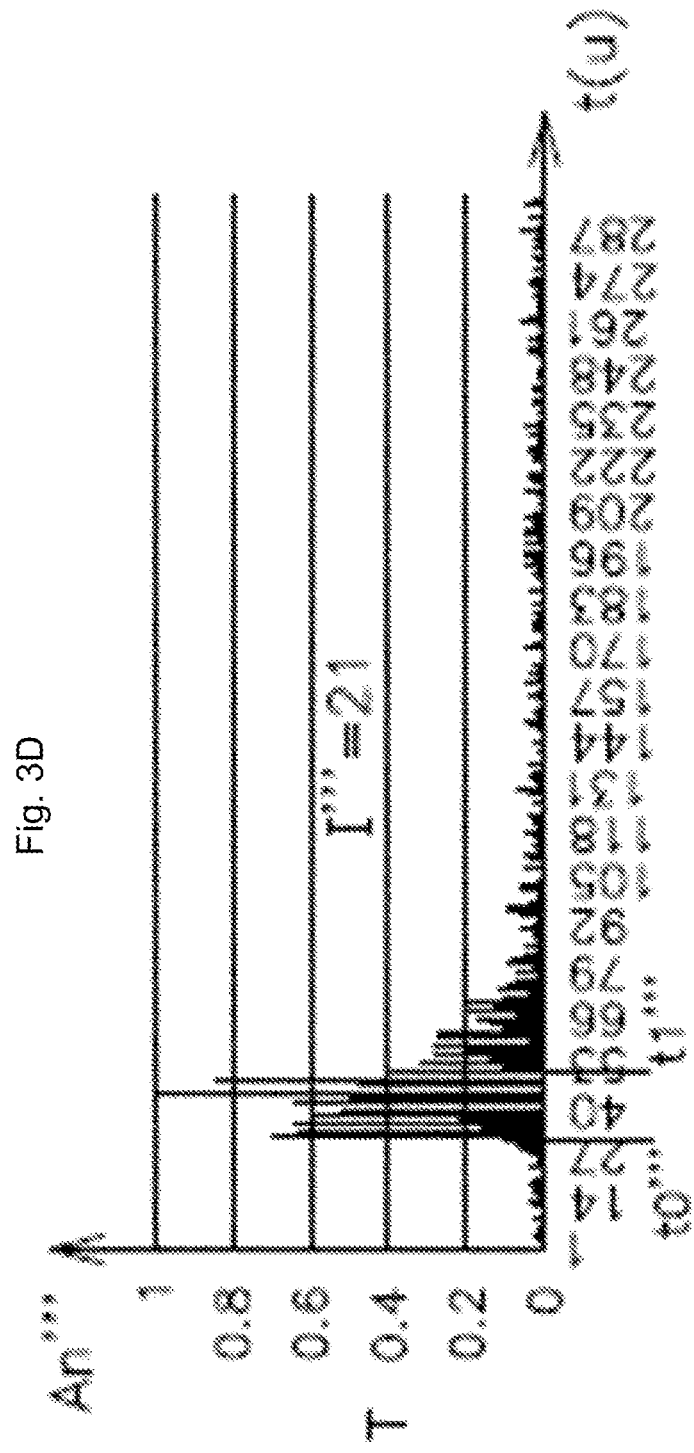
FIG. 3D is a graph showing, according to time, the normalized power of the multi-path signals received by the internal UWB antenna when the item of portable equipment P is located inside the vehicle V.

FIGS. 3A, 3B, 3C, 3D show the normalized power An of the multi-path signals received as a function of units of time (u), for four examples:
a. in FIG. 3A, the item of portable equipment P is located outside the vehicle V, and the normalized power An is that received by the external antenna A1,
b. in FIG. 3B, the item of portable equipment P is located outside the vehicle V, and the normalized power An' is that received by the internal antenna A2;
c. in FIG. 3C, the item of portable equipment P is located inside the vehicle V, and the normalized power An" is that received by the external antenna A1;
d. in FIG. 3D, the item of portable equipment P is located inside the vehicle V, and the normalized power An'" is that received by the internal antenna A1.

The normalized power An, An', An", An'" corresponds to the power of the signal received for each path at a time t divided by the maximum power value of the signals received within an observation duration range. It should be noted that in this case it is possible to use, for FIGS. 3A to 3D, either the normalized power or the absolute power of the signal.

For each module a computation of an attenuation delay "I" of the power of the signals is then carried out on the basis of a predefined power threshold T. Said attenuation delay "I" is obtained by computing the delay between the instant the normalized power crosses above the predefined power threshold T and the instant the normalized power crosses below the predefined power threshold T (Step E8).

By setting the power threshold T to 0.4 (that is, 40% of the maximum power), the attenuation delay I in FIG. 3A, is computed as follows:

$$I = t1 - t0 \qquad \text{[Math 1]}$$

With:
I: being the attenuation delay in units of time (u);
t0: being the instant the normalized power An crosses above the threshold T;
t1: being the instant the normalized power An crosses below the threshold T.

By applying the computation of the attenuation delay "I" of the power of the signals on the basis of the predefined power threshold T to each module ER1, ER2, the following is obtained:

In FIG. 3A, t0 is equal to 30, t1 is equal to 36, and therefore I is equal to 6.

By applying the same formula to graphs 3B, 3C, 3D, the following is obtained in FIG. 3B:

$$I' = t1' - t0 = 27 - 13 = 14 \qquad \text{[Math 2]}$$

In FIG. 3C:

$$I'' = t1'' - t0'' = 32 - 15 = 17 \qquad \text{[Math 3]}$$

In FIG. 3D:

$$I''' = t1''' - t0''' = 51 - 30 = 21 \qquad \text{[Math 4]}$$

The attenuation delays I, I', I", I'" are then compared with a predetermined reference delay Iref (Step E9).

Figure 5A:
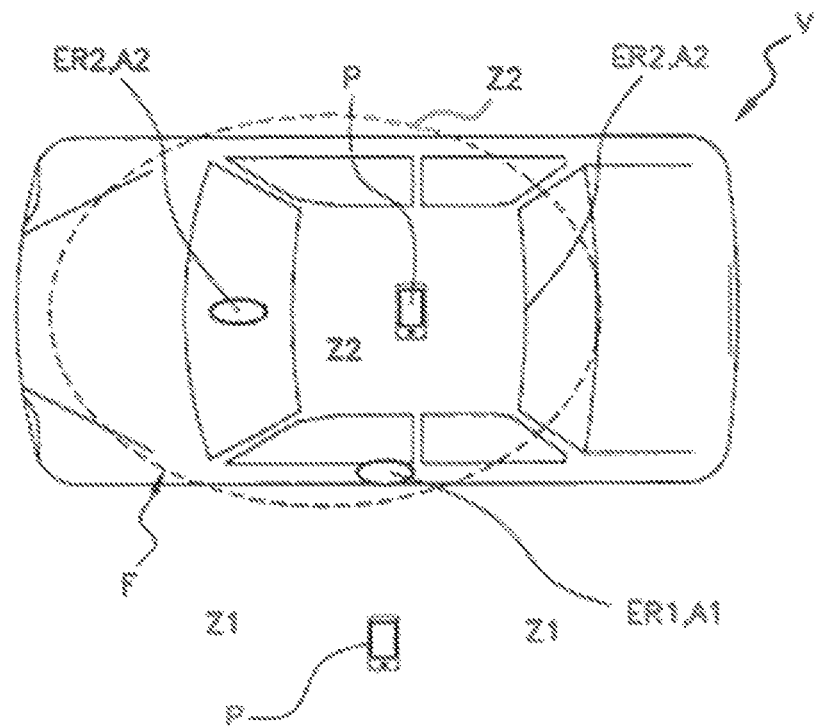
FIG. 5A schematically shows the limit between the internal zone and the external zone for locating the item of portable equipment relative to the vehicle.

FIG. 5A shows the vehicle V, an external zone Z1 and an internal zone Z2, as well as the boundary F between the two zones. The reference delay Iref is previously determined by placing the item of portable equipment P at the boundary F delimiting the two zones Z1, Z2, that is inside and outside the vehicle V (FIG. 5A), and by carrying out the following steps:
a. measuring the PDP or power offset profile of the multi-path UWB signals received by each antenna A1, A2;
b. computing, for each normalized power value An (received power divided by maximum power), the attenuation delay I of the UWB signals received by the external antenna A1 and by the internal antenna A2. The curve shown in FIG. 5B is then obtained for each antenna A1, A2.

A curve (see FIG. 5B) is then obtained showing the reference delay Iref as a function of the normalized power An. FIG. 5B illustrates the curve obtained for the first antenna A1.

Figure 5B:
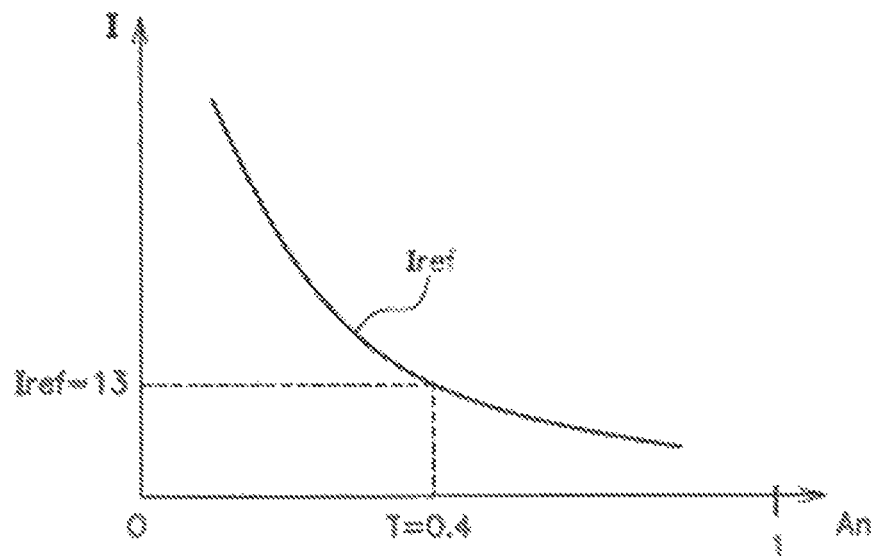
FIG. 5B is a graph showing the reference attenuation delay Iref as a function of the normalized power of the received multi-path signals by positioning the item of portable equipment at the boundary F between the internal zone and the external zone.

If the item of portable equipment P is located on this boundary P, then the reference delay Iref of the UWB signals, either received by the internal antenna A2 or by the external antenna A1, varies as a function of the normalized power according to the curve illustrated in FIG. 5b. An attenuation delay curve I by normalized power An is then obtained for each antenna A1, A2.

In FIG. 5B, if the power threshold T is set to 0.4, a reference delay Iref equal to 13 is obtained for the first antenna A1. This reference delay Iref can be different for the second antenna A2.

The position of the item of portable equipment P, either inside the vehicle V, or outside the vehicle V, is then determined as a function of the comparison between the attenuation delays I, I', I", I'" that are computed for each antenna A1, A2 with at least one of their reference delays Iref. The antenna with the highest attenuation delay deviation I, I', I", I'" relative to its reference delay Iref corresponds to the position of the item of portable equipment P relative to the vehicle V (step E9).

For explanatory purposes only, the two antennas A1, A2 in this case will be considered to have the same reference value, that is Iref is equal to 13.

Similarly, for the sake of the simplification of the description of the invention, the comparison between the attenuation delays I, I', I", I'" and a single reference delay Iref will be provided herein by way of an example. However, the precision for determining the location of the item of portable equipment P is improved if said comparison is repeated for several reference delays Iref selected for different normalized power values An according to the curve illustrated in FIG. 5b.

In this case, in FIGS. 3A and 3B, since the attenuation delays I measured by the external A1 and internal A2 antennas respectively equal: I is equal to 6, I' is equal to 14, then I represents the greatest deviation relative to Iref, which is equal to 13, i.e., $$|I-Iref|>|I'-Iref| \qquad \text{[Math 5]}$$

In this case, it is the attenuation delay measured by the external antenna A1 that has the greatest variation relative to the reference delay Iref, it is deduced therefrom that the item of portable equipment P is located outside the vehicle V, in the external zone Z1 (step E10b), and unlocking of the vehicle V can be authorized (step E11b).

Conversely, in FIGS. 3C and 3D, since the attenuation delays I" measured by the external A1 and internal A2 antenna respectively equal: I" is equal to 17, I'" is equal to 21, then I'" represents the greatest deviation relative to Iref, which is equal to 13, i.e., $$|I''-Iref|<|I'''-Iref| \qquad \text{[Math 6]}$$

In this case, it is the attenuation delay measured by the internal antenna A2 that has the greatest variation relative to the reference delay Iref, it is deduced therefrom that the item of portable equipment P is located inside the vehicle, in the internal zone Z2 (step E10a) and starting of the vehicle V can be authorized (Step E11a).

The invention therefore makes it possible to determine, by appropriately using multi-path ultra-wideband signals, whether the item of portable equipment P is located inside or outside the vehicle V.

The invention is inexpensive, since it requires only two antennas, a transmission/reception module and analysis and processing means M1 to robustly overcome the disadvantages of the prior art.

The invention claimed is:

1. A method for activating a vehicle function via ultra-wide band communication using an item of portable user equipment communicating via ultra-wide band with an activation device on board the vehicle, the activation of the vehicle function being carried out as a function of a position of the item of portable user equipment relative to a boundary between an internal zone and an external zone of the vehicle, the activation method comprising:
   a) previously equipping the vehicle with an internal antenna and an external antenna;
   b) determining a presence of the item of portable user equipment in an authorization zone around the vehicle;
   c) storing a power delay of multi-path ultra-wide band signals received by each of the internal antenna and the external antenna according to time;
   d) determining an attenuation delay of received power for at least one power threshold value for each of the internal antenna and the external antenna;
   e) comparing said attenuation delay with at least one reference delay;
   f) determining, as a function of the result of said comparison, whether the item of portable user equipment is located in the internal zone or in the external zone; and
   g) activating the vehicle function corresponding to the position of the item of portable user equipment.

2. The activation method as claimed in claim 1, wherein the reference delay is previously determined as a function of the power of the received signals, for each antenna when the item of portable user equipment is located at the boundary between the internal zone and the external zone of the vehicle.

3. The activation method as claimed in claim 1, wherein the attenuation delay is determined for several power thresholds and is compared with several corresponding reference delays.

4. The activation method as claimed in claim 1, wherein the vehicle function involves unlocking a door of the vehicle, when the item of portable user equipment is located in the external zone.

5. The activation method as claimed in claim 1, wherein the vehicle function involves starting the vehicle when the item of portable user equipment is located in the internal zone of the vehicle.

6. A device for activating a vehicle function via ultra-wideband, intended to be on board a vehicle and communicating via ultra-wideband with an item of portable user equipment, the activation of the vehicle function being carried out as a function of a position of the item of portable user equipment relative to a boundary between an internal zone and an external zone of the vehicle, said device comprising an electronic management unit controlling the activation of the function, comprising:
   a) an internal antenna;
   b) an external antenna;
   c) means for determining the presence of the item of portable user equipment in an unlocking zone around the vehicle;
   d) means for analyzing and processing the multi-path ultra-wideband signals received by said antennas, said means for analyzing and processing comprising:
      i) a memory storing a power delay of the multi-path ultra-wideband signals received by each antenna according to time; and
      ii) a processor:
         determining an attenuation delay for at least one power threshold value for each antenna;
         comparing said attenuation delay with at least one reference delay;
         determining, as a function of the result of said comparison, whether the item of portable user equipment is located in the internal zone or in the external zone; and
         activating the vehicle function corresponding to the location of the item of portable user equipment.

7. The device for activating as claimed in claim 6, wherein the means for analyzing and processing are included in a transmission/reception module of the vehicle.

8. A system for activating a vehicle function, comprising the device for activating as claimed in claim 6 and the item of portable user equipment, wherein the means for analyzing and processing are included in the item of portable user equipment.

9. A motor vehicle, comprising the device for activating as claimed in claim 6.

10. A system for activating a vehicle function by ultra-wideband, comprising an activation device intended to be on board a vehicle and an item of portable user equipment, the activation device and the item of portable user equipment communicating with each other via ultra-wide band, the activation of the vehicle function being carried out as a function of a position of the item of portable user equipment relative to a boundary between an internal zone and an external zone of the vehicle, the system comprising:

a) said device comprises an electronic management unit controlling the activation of the vehicle function, an internal antenna, an external antenna, at least one transmission/reception module connected to said antennas, means for determining the presence of the item of portable user equipment in an unlocking zone around the vehicle;

b) said item of portable user equipment comprises means for analyzing and processing the multi-path ultra-wideband signals received by said antennas, said means for analyzing and processing comprising:

i) a memory storing a power delay of the multi-path ultra-wideband signals received by each antenna according to time; and ii) a processor:

determining an attenuation delay for at least one power threshold for each antenna;

comparing said attenuation delay with at least one reference delay;

determining, as a function of said comparison, whether the portable user equipment is located in the internal zone or in the external zone; and activating the vehicle function corresponding to the location of the item of portable user equipment.

\* \* \* \* \*